United States Patent
Baumer

(10) Patent No.: US 8,023,436 B2
(45) Date of Patent: Sep. 20, 2011

(54) MULTI-RATE, MULTI-PORT, GIGABIT SERDES TRANSCEIVER

(75) Inventor: Howard A. Baumer, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 318 days.

(21) Appl. No.: 12/078,780

(22) Filed: Apr. 4, 2008

(65) Prior Publication Data

US 2008/0186987 A1    Aug. 7, 2008

Related U.S. Application Data

(63) Continuation of application No. 11/389,506, filed on Mar. 27, 2006, now Pat. No. 7,355,987, which is a continuation of application No. 10/694,788, filed on Oct. 29, 2003, now Pat. No. 7,035,228.

(60) Provisional application No. 60/421,780, filed on Oct. 29, 2002.

(51) Int. Cl.
    *H04L 12/28* (2006.01)
(52) U.S. Cl. ..................... 370/258
(58) Field of Classification Search .......... 370/247, 370/257, 258, 278, 282, 333, 362, 365, 366, 370/403, 405, 421, 460, 356; 710/20
    See application file for complete search history.

(56) References Cited

U.S. PATENT DOCUMENTS

| | | | |
|---|---|---|---|
| 4,627,070 A | 12/1986 | Champlin et al. | |
| 4,821,174 A | 4/1989 | Webb et al. | |
| 4,833,605 A | 5/1989 | Terada et al. | |
| 4,833,695 A | 5/1989 | Greub | |
| 4,967,201 A | 10/1990 | Rich, III | |
| 5,726,991 A | 3/1998 | Chen et al. | |
| 5,751,699 A | 5/1998 | Radke | |
| 5,793,990 A | 8/1998 | Jirgal et al. | |
| 5,933,021 A | 8/1999 | Mohd | |
| 6,081,570 A | 6/2000 | Ghuman et al. | |
| 6,137,734 A | 10/2000 | Schoner et al. | |
| 6,140,956 A | 10/2000 | Hillman et al. | |
| 6,259,693 B1 | 7/2001 | Ganmukhi | |

(Continued)

OTHER PUBLICATIONS

Ed Turner, David Law, Sep. 17-19, 2001, "IEEE P802.3ae MDC/MDIO", http://www.ieee802.org/3/efm/public/sep01/turner_1_0901.pdf.

(Continued)

*Primary Examiner* — Chi Pham
*Assistant Examiner* — Alexander Boakye
(74) *Attorney, Agent, or Firm* — Sterne, Kessler, Goldstein & Fox P.L.L.C.

(57) ABSTRACT

A multi-port SERDES transceiver includes multiple parallel ports and serial ports, and includes the flexibility to connect any one of the parallel ports to another parallel port or to a serial port, or both. Furthermore, the multi-port transceiver chip can connect any one of serial ports to another serial port or to one of the parallel ports. The substrate layout of the multi-port SERDES transceiver chip is configured so that the parallel ports and the serial ports are on the outer perimeter of the substrate. A logic core is at the center of the substrate, where the logic core operates the serial and parallel data ports, and the bus that connects the data ports. The bus can be described as a "ring" structure (or donut "structure") around the logic core, and is configured between the logic core and the data ports. The ring structure of the bus provides efficient communication between the logic core and the various data ports.

20 Claims, 15 Drawing Sheets

U.S. PATENT DOCUMENTS

| | | | |
|---|---|---|---|
| 6,317,804 | B1 | 11/2001 | Levy et al. |
| 6,438,717 | B1 | 8/2002 | Butler et al. |
| 6,483,849 | B1 | 11/2002 | Bray et al. |
| 6,721,313 | B1 * | 4/2004 | Van Duyne ............ 370/386 |
| 7,032,139 | B1 | 4/2006 | Iryami et al. |
| 7,035,228 | B2 | 4/2006 | Baumer |
| 7,068,650 | B1 * | 6/2006 | Bachar et al. ............ 370/380 |
| 7,280,549 | B2 * | 10/2007 | Regev et al. ............ 370/404 |
| 7,355,987 | B2 | 4/2008 | Baumer |
| 7,376,146 | B2 * | 5/2008 | Beverly et al. ............ 370/465 |
| 2001/0012288 | A1 | 8/2001 | Yu |
| 2001/0015664 | A1 | 8/2001 | Taniguchi |
| 2001/0017595 | A1 | 8/2001 | Cliff et al. |
| 2001/0021953 | A1 | 9/2001 | Nakashima |
| 2002/0054569 | A1 | 5/2002 | Morkawa |
| 2003/0009307 | A1 | 1/2003 | Mejia et al. |
| 2003/0048781 | A1 | 3/2003 | Peirson |
| 2003/0120791 | A1 | 6/2003 | Weber et al. |
| 2003/0172332 | A1 | 9/2003 | Rearick et al. |
| 2004/0083077 | A1 | 4/2004 | Baumer et al. |
| 2004/0088443 | A1 | 5/2004 | Tran et al. |
| 2004/0117698 | A1 | 6/2004 | Tran et al. |
| 2004/0141497 | A1 | 7/2004 | Amirichimeh et al. |
| 2004/0141531 | A1 | 7/2004 | Amirichimeh et al. |
| 2005/0190690 | A1 | 9/2005 | Tran |
| 2006/0250985 | A1 | 11/2006 | Baumer |

OTHER PUBLICATIONS

Alaska Quad-Port Gigabit Ethernet Over Copper Transceivers, from http://www.marvell.com/products/transceivers/quadport/ . . . . , 1 page, printed May 8, 2007.

Alaska X10 Gigabit Ethernet Alaska Gigabit Ethernet Fast Ethernet Physical Layer (PHY) Transceiver Families Provide a Full Range of Ethernet Transceiver Solutions for the Broadband Communications Industry, from http://www.nuhorizons.com/FeaturedProducts/Volume3/Marvell/ phy_transceiver.asp, 4 pages, Copyright 2007, printed May 8, 2007.

International Search Report issued Dec. 14, 2004 for International Application No. PCT/US03/34234, 5 pages.

Industry Breakthrough: Marvell Announces the First Quad-Port Transceiver to Support Both Copper and Fiber-Optic Gigabit Ethernet Interfaces, from Business Wire at www.encyclopedia.com/printable/aspx?id=1G1:68912211, 4 pages, Jan. 9, 2001, printed May 8, 2007.

David Maliniak (ed.), Bel's integrated connector modules support Marvell's Alaska quad Gigabit Ethernet transceiver, from http://www.electronicsweb.com/Content/news/ . . . . , 1 page, Dec. 14, 2000, printed May 8, 2007.

Marvell Gets Small, from http://www.lightreading.com/document.asp?doc_id=12004&print=true, 1 page, Feb. 19, 2002, printed May 8, 2007.

Marvell Introduces the Industry's Smallest Quad-Port Gigabit Transceiver Device, Enabling Ultra High Port Density Enterprise Switching Systems, from http://www.marvell.com/press/press NewsDisplay.do?releaseID-41, 3 pages, Feb. 19, 2002, printed May 8, 2007.

Q&A: Hiroshi Suzuki on Extending Ethernet Beyond the LAN, from http://newsroom.cisco.com/dlls/innovators/optical/hiroshi_suzuki_qa.html, 3 pages, Copyright 1992-2003, printed Jul. 29, 2003.

IEEE Std. 802.3, Part 3: Carrier Sense Multiple Access with Collision Detection (CSMA/CD) access method and physical layer specifications, Section Two, pp. 9-55, Copyright 2002.

IEEE Std. 802.3, Part 3: Carrier Sense Multiple Access with Collision Detection (CSMA/CD) access method and physical layer specifications, Section Four, pp. 9-152, Copyright 2005.

Cisco Systems, Hiroshi Suzuki: Taking Ethernet Beyond the LAN, http://newsroom.cisco.com/dlls/innovators/optical/hiroshi_suzuki_profile.html.

Cisco Systems, Q&A: Hiroshi Suzuki on Extending Ethernet Beyond the LAN, http://newsroom.cisco.com/dlls/innovators/optical/hiroshi_suzuki_qa.html.

Cisco Systems, Innovators Profiles, http://newsroom.cisco.com/dlls/innovators/inn_profiles.html.

Cisco Systems, Optical, http://newsroom.cisco.com/dlls/innovatros/optical/ Cisco Systems, Cisco Systems ad Aretae Interactive Launch Internet Powered Property (IP2), http://newroom.cisco.com/dlls/global/asiapac/news/2000/pr_07-25.html.

"Broadcom Announces the First 0.13-micron CMOS Multi-Rate Gigabit Octal Serializers/Deserializers" [online], Broadcom Press Release, Oct. 29, 2002 [retrieved on Jul. 16, 2003]. Retrieved from the Internet: <URL: http://www.broadcom.com/cgi-bin/pr/prps.cgi?pr_id=PR021029> (5 pages).

BCM8040 8-Channel Multi-rate 1.0-3.2-GBPS Retimer Switch [online], Broadcom Products Site Guide [retrieved on Jul. 16, 2003]. Retrieved from the Internet: <URL: http://www.broadcom.com/products/8040.html> (2 pages).

8-Channel Multi-Rate CMOS Retimer with Full Redundancy [online], BCM8040 Product Brief, Broadcom Corporation (2002) [retrieved on Jul. 16, 2003]. Retrieved from the Internet<URL: http://www.broadcom.com/products/8040.html> (2 pages).

BCM8020 8-Channel Multi-rate 1.0-3.2-GBPS Transceiver [online], Broadcom Products Site Guide [retrieved on Jul. 16, 2003]. Retrieved from the Internet: <URL: http://www.broadcom.com/products/8020.html> (2 pages).

8-Channel Multi-Rate CMOS Transceiver with Full Redundancy [online], BCM8020 Product Brief, Broadcom Corporation (2002) [retrieved on Jul. 16, 2003]. Retrieved from the Internet: <URL: http://www.broadcom.com/products/8020.html> (2 pages).

BCM8021 4-Channel Multi-rate 1.0-3.2-GBPS Transceiver with High-Speed Redundancy [online], Broadcom Products Site Guide [retrieved on Jul. 16, 2003]. Retrieved from the Internet: <URL: http://www.broadcom.com/products/8021.html> (2 pages).

4-Channel Multirate 1.0-3.2-GBPS Transceiver with High-Speed Redundancy [online], BCM8021 Product Brief, Broadcom Corporation (2002) [retrieved on Jul. 16, 2003]. Retrieved from the Internet: <URL: http://www.broadcom.com/products/8021.html> (2 pages).

Broadcom Announces the Industry's First 0.13-micron CMOS Advanced Transciver Solution with Signal Conditioning for Low-Cost 10-Gigabit Over Copper Links [online], Broadcom Press Release, Apr. 29, 2003 [retrieved on Jul. 16, 2003]. Retrieved from the Internet: <URL: http://www.broadcom.com/cgi-bin/pr/prps.cgi?pr_id=PR030429A> (4 pages).

European Supplementary Search Report for European Patent Application No. 03 77 9391, European Patent Office, Munich, Germany, issued May 25, 2010 (search completed on May 12, 2010).

* cited by examiner

MULTI-RATE, MULTI-PORT, GIGABIT SERDES TRANSCEIVER

CROSS-REFERENCE TO RELATED APPLICATIONS

This application is a continuation of U.S. patent application Ser. No. 11/389,506, filed Mar. 27, 2006, now U.S. Pat. No. 7,355,987, which is a continuation of U.S. patent application Ser. No. 10/694,788, filed Oct. 29, 2003, now U.S. Pat. No. 7,035,228, which claims the benefit of U.S. Provisional Application No. 60/421,780, filed on Oct. 29, 2002, all of which are incorporated herein by reference.

BACKGROUND OF THE INVENTION

1. Field of the Invention

The present invention generally relates to serial de-serializer integrated circuits with multiple high speed data ports, and more particularly to a serial and de-serializer chip that includes the functionality to switch between multiple high speed data ports.

2. Related Art

High speed data links transmit data from one location to another over transmission lines. These data links can include serial deserializer data links (i.e. SERDES) that receive data in a parallel format and convert the data to a serial format for high speed transmission. SERDES data links can be part of a backplane in a communications system (e.g. Tyco Backplane 30-inch trace).

In a high speed back plane configuration, it is often desirable to switch between multiple SERDES links. In other words, it is often desirable to switch between any one of multiple SERDES links to another SERDES link, and to do so in a low power configuration on a single integrated circuit.

BRIEF SUMMARY OF THE INVENTION

A multi-port SERDES transceiver includes multiple parallel ports and serial ports, and includes the flexibility to connect any one of the parallel ports to another parallel port or to a serial port, or both. Furthermore, the multiport transceiver chip can connect any one of the serial ports to another serial port or to one of the parallel ports. The multi-port SERDES transceiver is able to operate at multiple data rates.

The multi-port SERDES transceiver also includes a packet bit error rate tester (BERT). The packet BERT generates and processes packet test data that can be transmitted over any of the serial ports to perform bit error testing. The packet BERT can monitor (or "snoop") between the serial ports. In other words, if data is being transmitted from one serial port to another serial port, the packet BERT can capture and store a portion of this data for bit error testing.

The substrate layout of the multi-port SERDES transceiver chip is configured so that the parallel ports and the serial ports are on the outer perimeter of the substrate. A logic core is at the center of the substrate, where the logic core operates the serial and parallel data ports, and a bus that connects the data ports. The bus can be described as a "ring" structure (or donut "structure") around the logic core, and is configured between the logic core and the data ports. The ring structure of the bus provides efficient communication between the logic core and the various data ports.

The SERDES transceiver described herein is highly flexible and can be configured to provide multiple different transceiver products from enabling and disabling various serial and parallel data ports. This is accomplished using a configuration logic circuit that enables/disables these data ports. As a result, several different transceiver products, with different capabilities and price points, can be configured from a single semiconductor die.

Further features and advantages of the present invention, as well as the structure and operation of various embodiments of the present invention, are described in detail below with reference to the accompanying drawings.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

FIG. 1 illustrates a multi-port SERDES chip according to embodiments of the present invention.

FIG. 2 further illustrates the multi-port SERDES chip including a parallel-to-serial conversion according to embodiments of the present invention.

FIG. 3 further illustrates the operation of the transceiver 100 in the routing of serial data between ports according to embodiments of the present invention.

Figure 7:
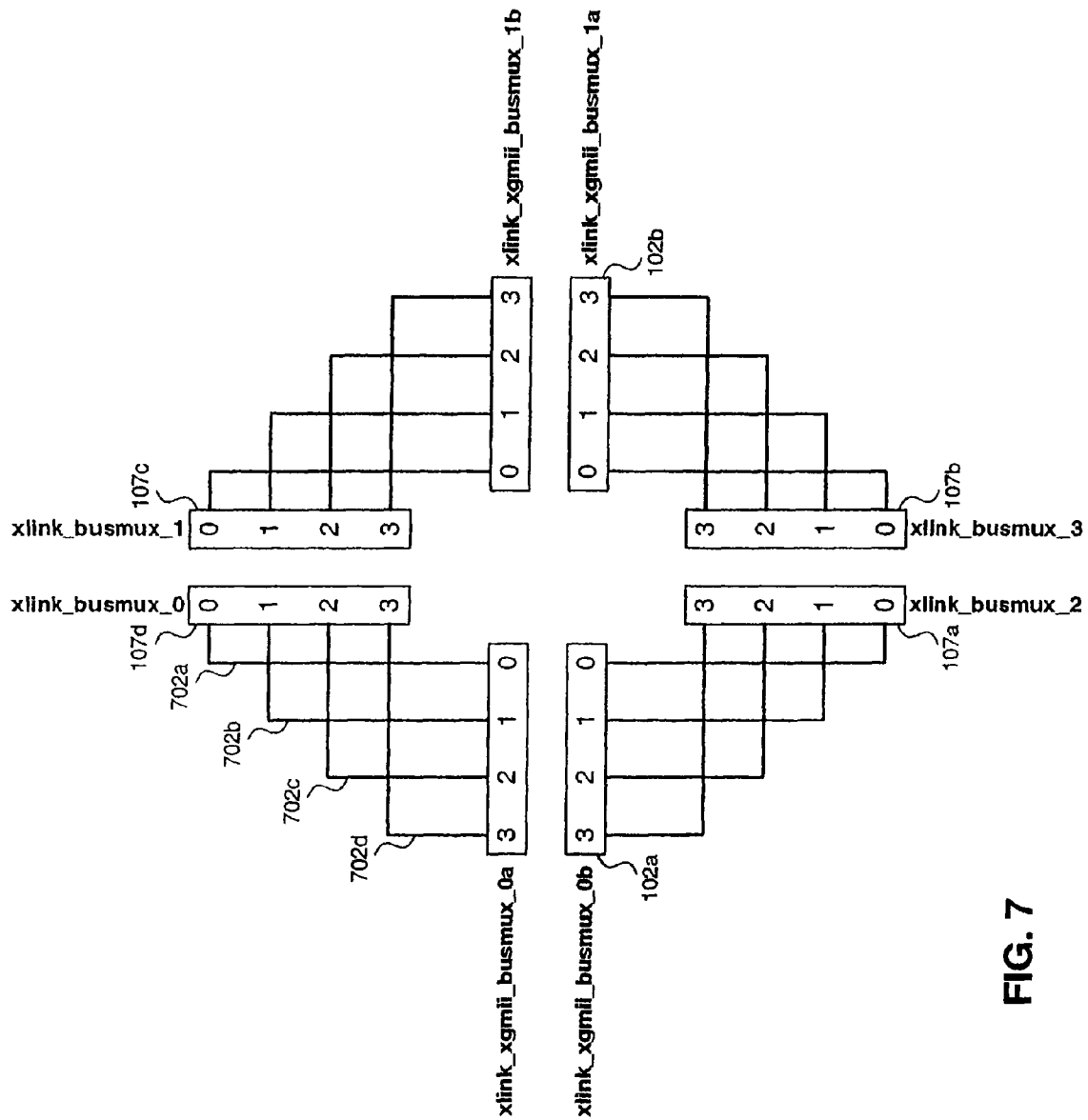

FIG. 7 further illustrates the bus 106 having equal length transmission lines according to embodiments of the present invention.

Figure 8:
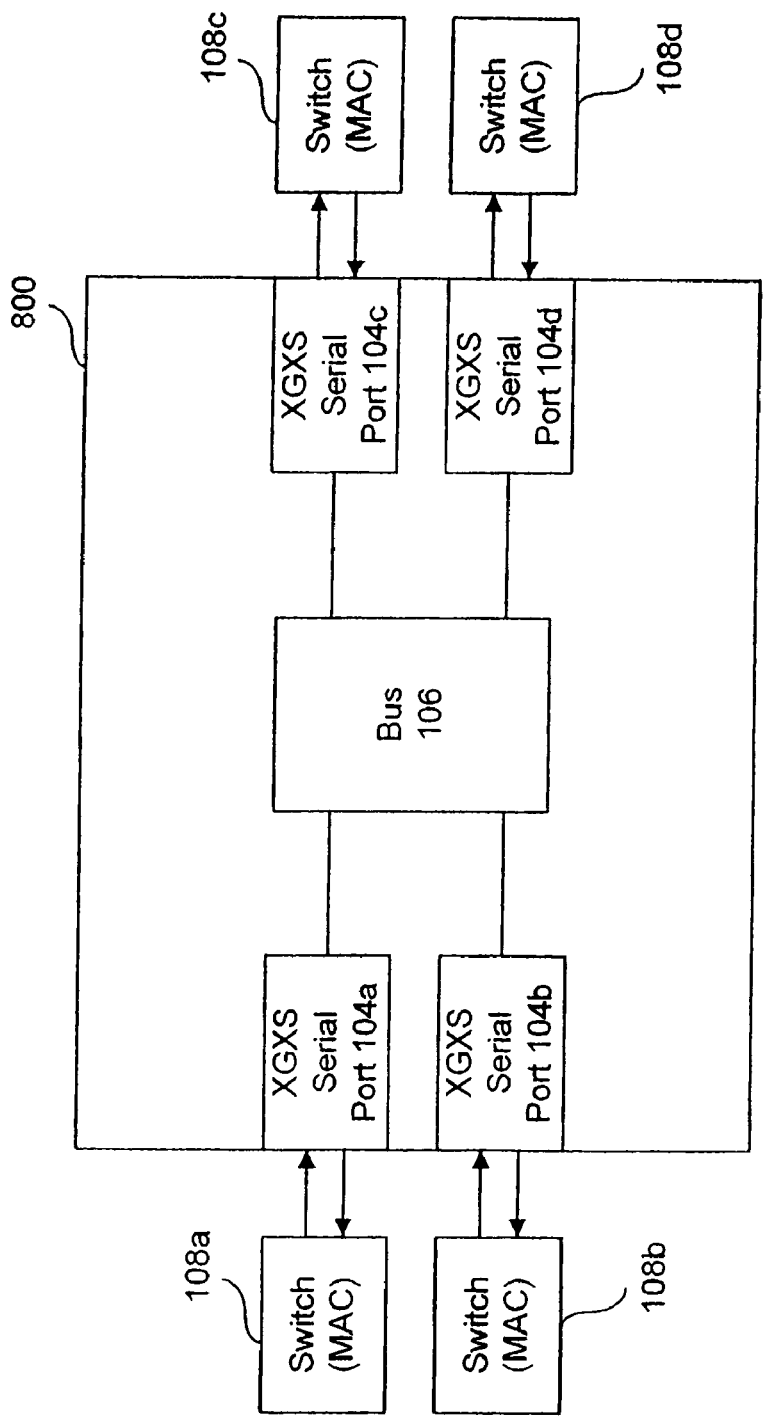

FIG. 8 illustrates a transceiver 800, which is one configuration of the transceiver 400.

Figure 9:
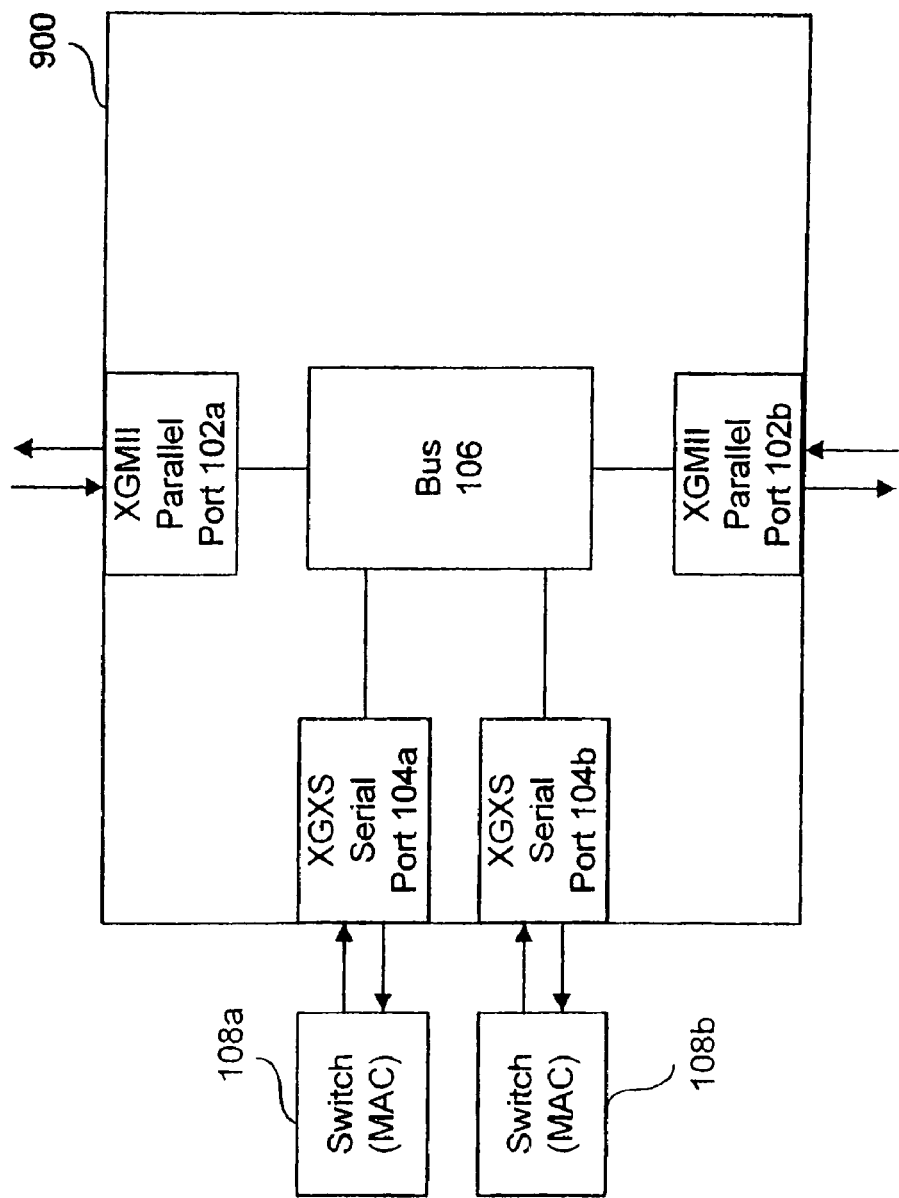

FIG. 9 illustrates a transceiver 900, which is another configuration of the transceiver 400.

Figure 10:
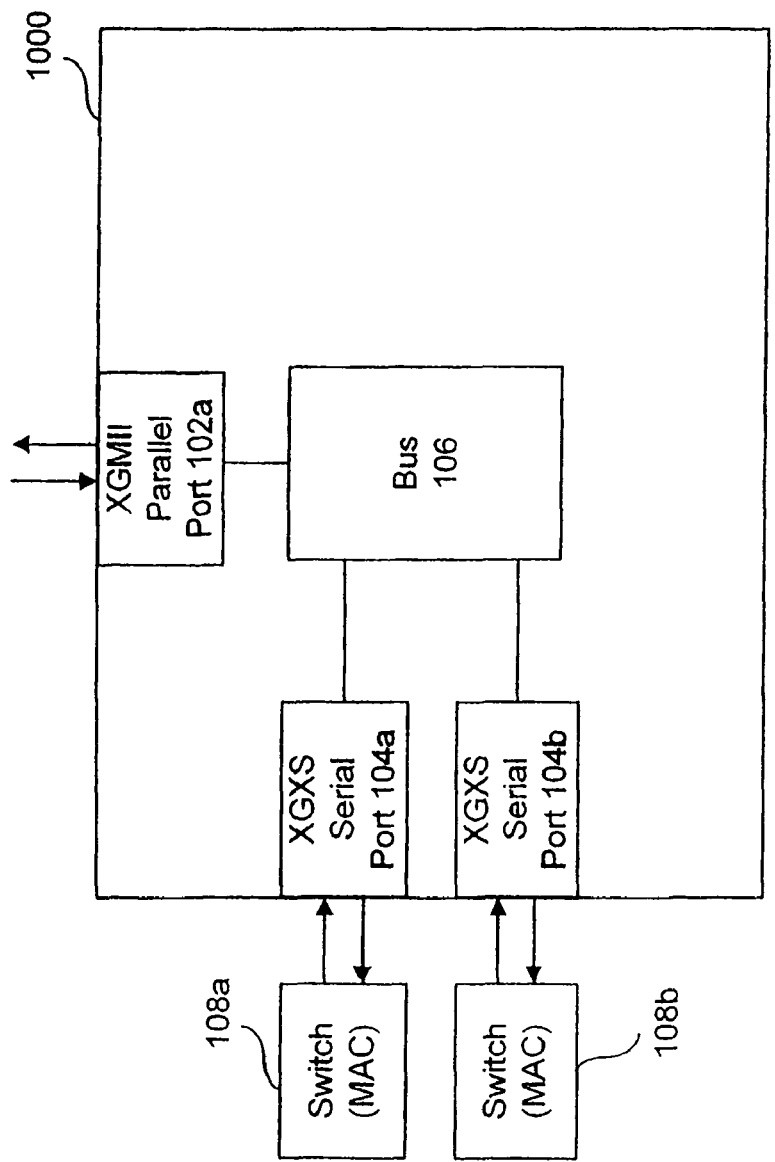

FIG. 10 illustrates a transceiver 1000, which is another configuration of the transceiver 400.

Figure 11:
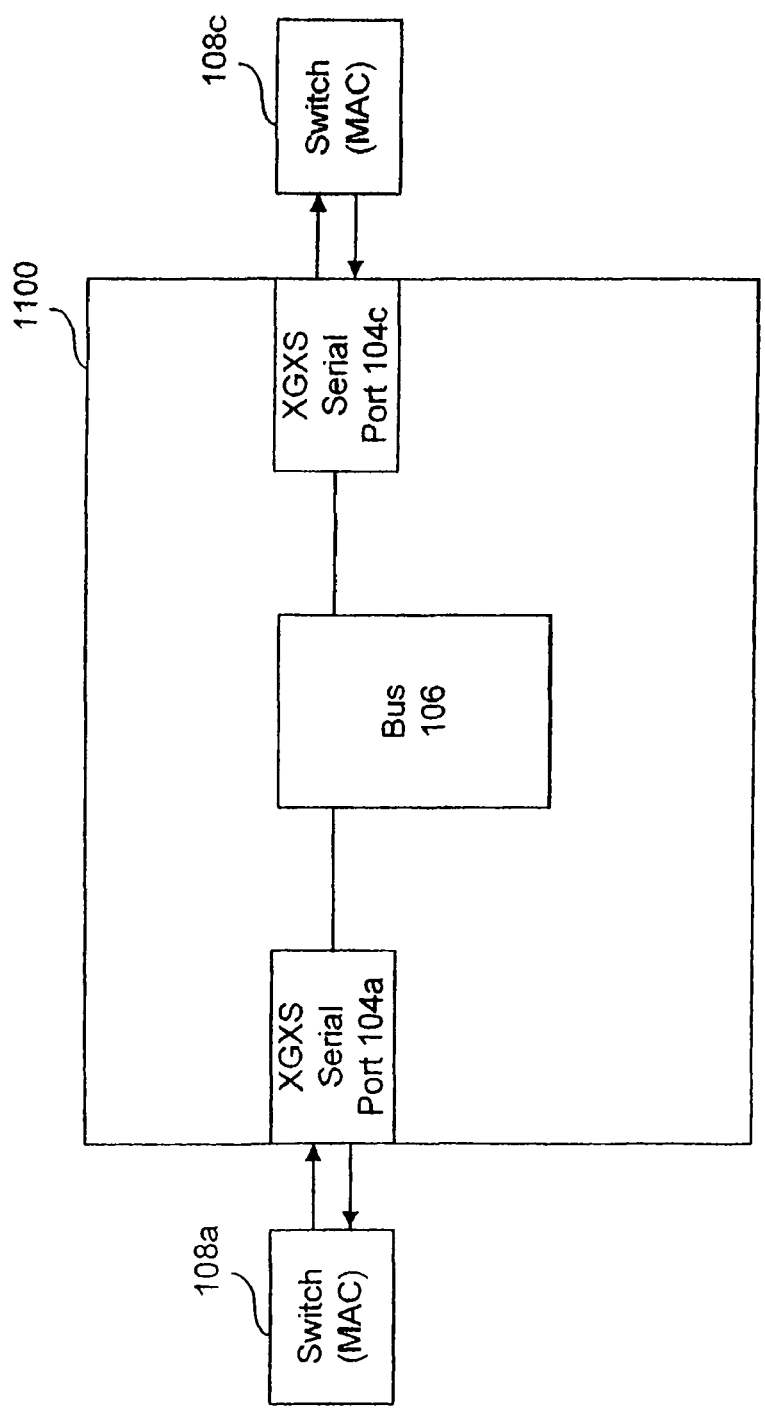

FIG. 11 illustrates a transceiver 1100, which is another configuration of the transceiver 400.

Figure 12:
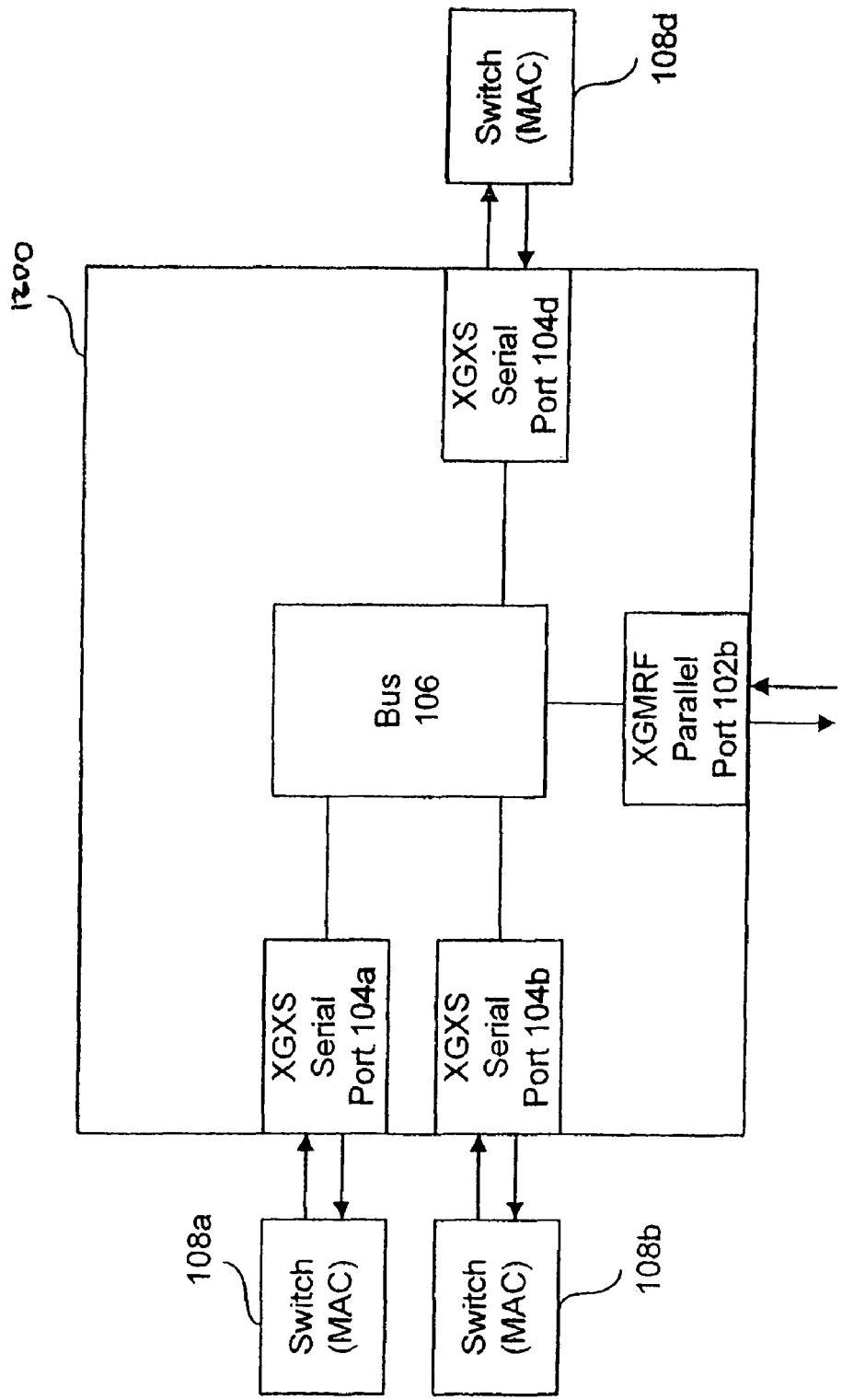

FIG. 12 illustrates a transceiver 1200, which is another configuration of the transceiver 400.

Figure 13:
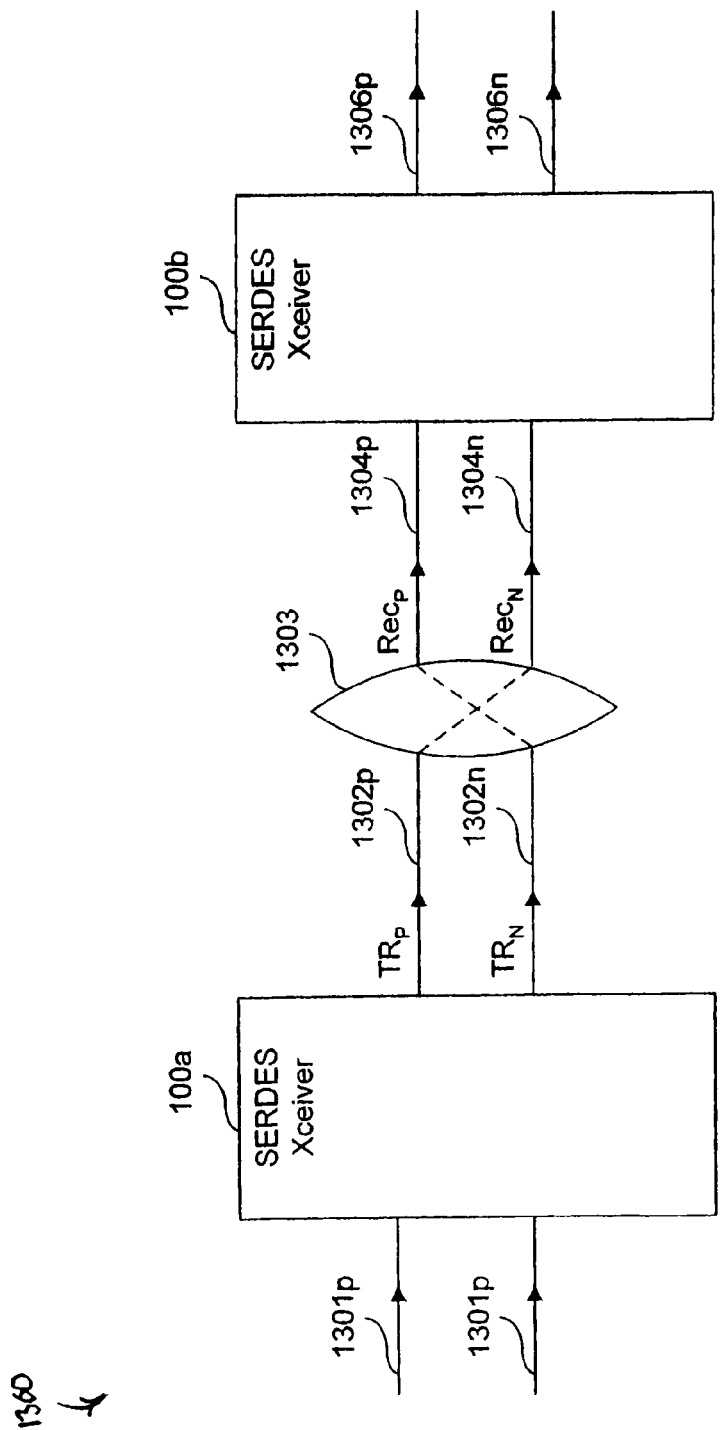

FIG. 13 illustrates a communications system with a backplane interface.

Figure 14:
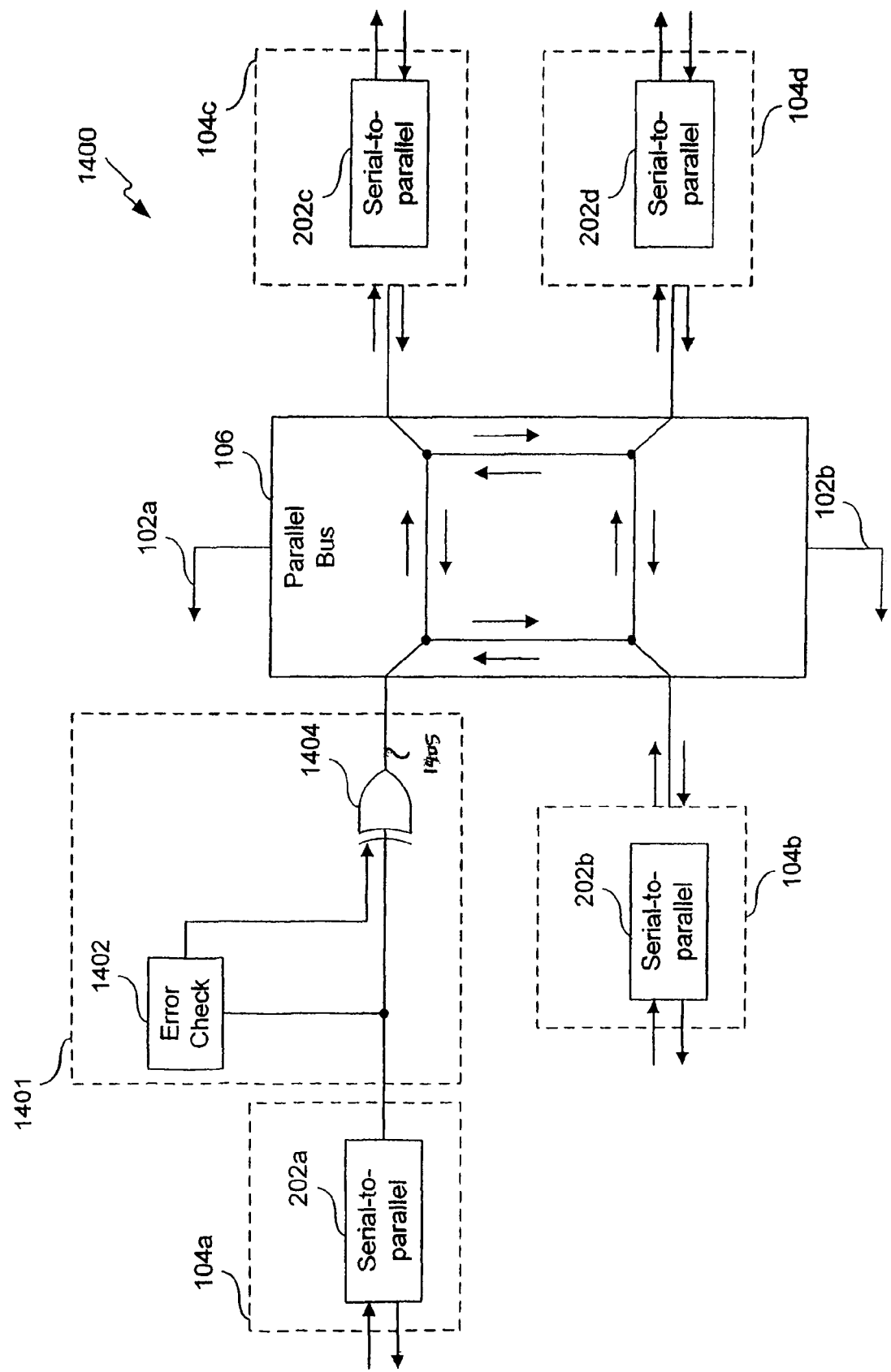

FIG. 14 illustrates a transceiver 1400 with automatic polarity swap according to embodiments of the present invention.

Figure 15:
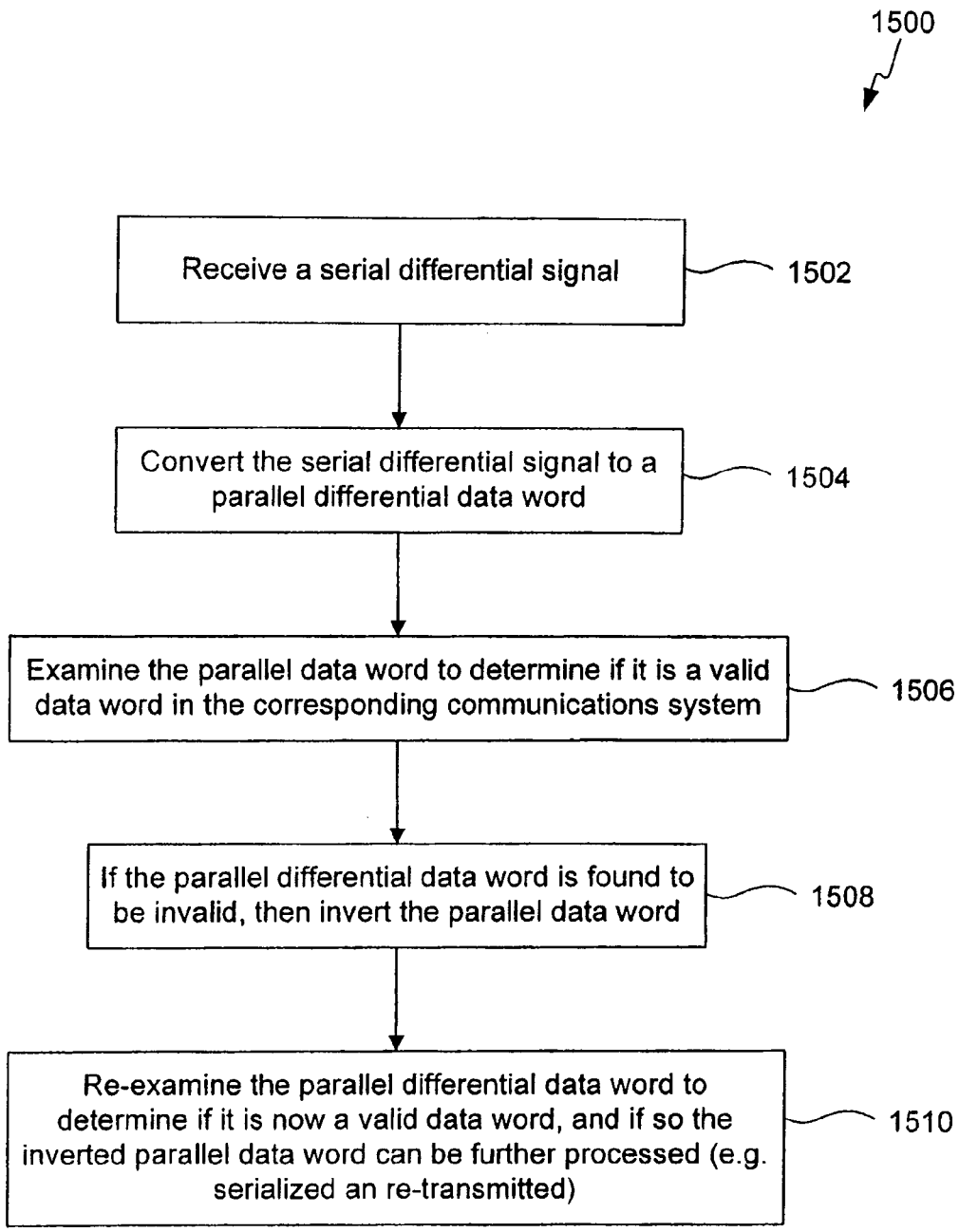

FIG. 15 illustrates a flowchart that further describes automatic polarity swap according to embodiments of the present invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner. Likewise, particular bit values of "0" or "1" (and representative voltage values) are used in illustrative examples provided herein to represent information for purposes of illustration only. Information described herein can be represented by either bit value (and by alternative voltage values), and embodiments described herein can be configured to operate on either bit value (and any representative voltage value), as would be understood by persons skilled in the relevant art(s).

The example embodiments described herein are provided for illustrative purposes, and are not limiting. Further structural and operational embodiments, including modifications/alterations, will become apparent to persons skilled in the relevant art(s) from the teachings herein.

Figure 1:
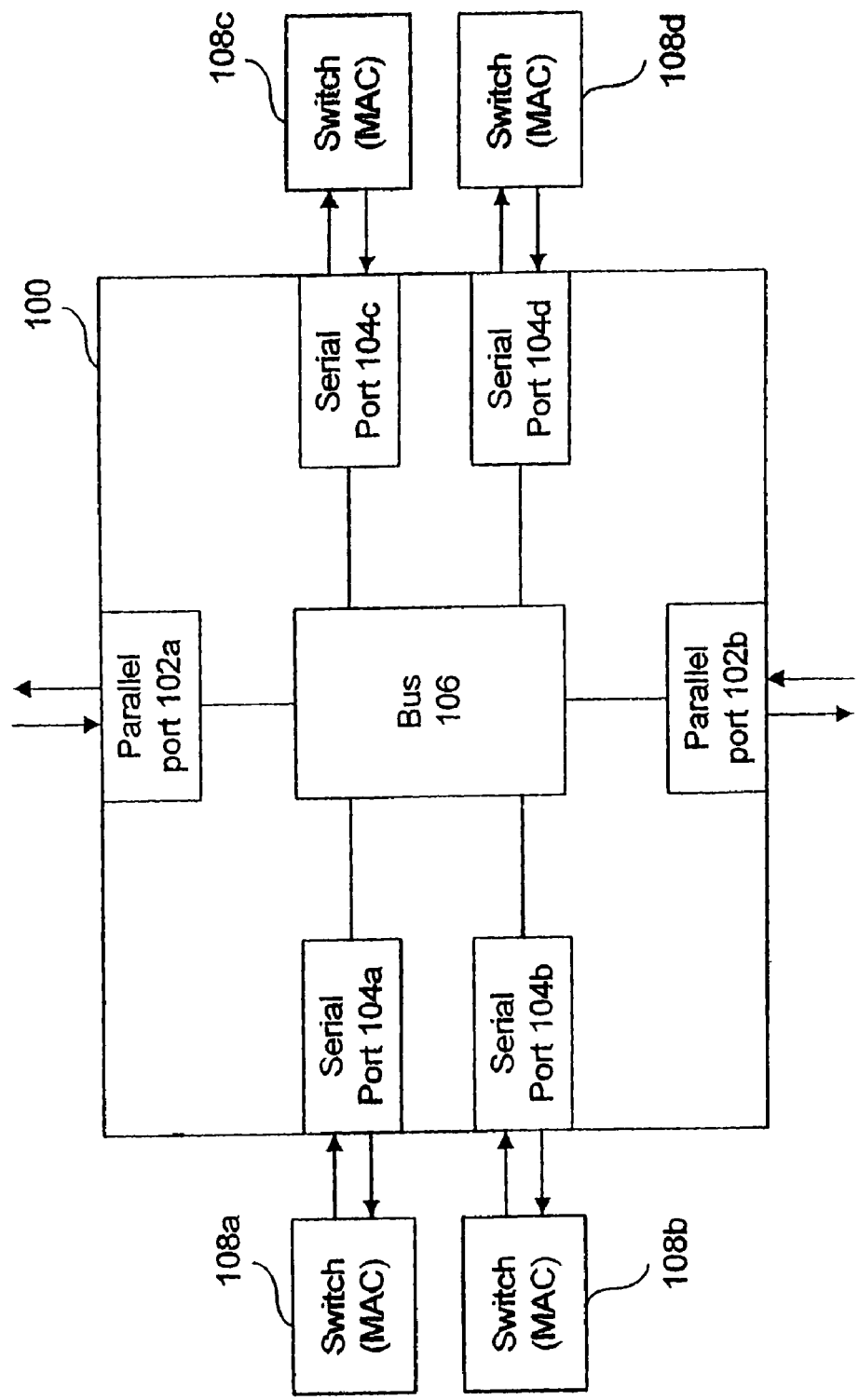

FIG. 1 illustrates a multi-port transceiver 100 according to embodiments of the present invention. Transceiver 100 includes a plurality of serial ports 104*a-d*, a plurality of parallel ports 102*a-b*, and a bus 106. Each of the plurality of serial ports 104 is capable of transmitting and receiving data in a serial format, and each of the parallel ports 102 is capable of transmitting and receiving data in a parallel format. For example, the serial ports 104 could be transmitting and receiving serial data with corresponding switches (e.g. MACs) 108*a-d*.

The transceiver 100 also includes a bus 106 that is coupled to the serial ports 104*a-d* and the parallel ports 102*a* and 102*b*. The bus 106 enables any serial port 104 to be connected to any other serial port 104 and to any parallel port 102 for data transmission, and vice versa. Therefore, data can be transmitted from any switch 108 to any other switch 108, or can be transmitted and received to and from the parallel ports 102. For example, data received at the serial port 104*a* from switch 108*a* can be routed to the serial port 104*c* by the bus 106, for transmission to the switch 108*c*. Additionally, data from the switch 108*a* can be routed to the other serial ports 104*b-d* and to the parallel ports 102*a* and 102*b* through the bus 106.

Figure 2:
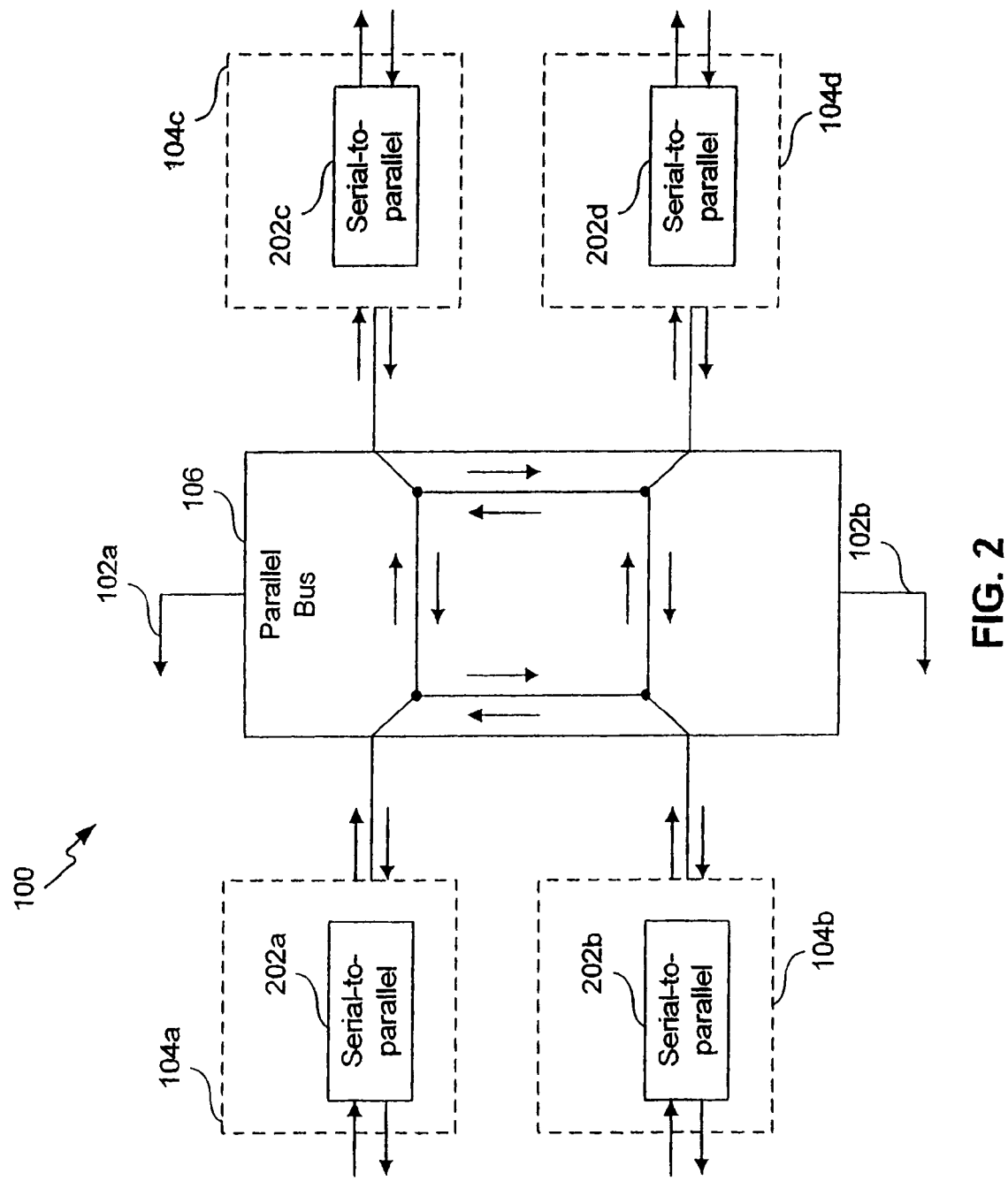

FIG. 2 illustrates that each serial port 104 can include a serial-to-parallel converter 202, so that serial data processed by the port 104 can be converted to parallel data, and vice versa. In other words, serial data received by serial ports 104 from corresponding switches 108 can be converted to parallel data and routed on the bus 106. The serial-to-parallel converters 202 are bi-directional, so that parallel data from the bus 106 can be converted to serial data for transmission from the serial port 104 to the corresponding switch 108. Furthermore, the parallel data from the bus 106 can also be converted to serial for transmission to the switch 108.

FIG. 2 also illustrates the bus 106 to have a "ring structure" that enables the data to be sent from one adjacent port 104 to another adjacent port 104. For example, data from port 104*a* is directly transmitted to ports 104*b* and 104*c* over the ring structure of the bus 106. Therefore, data from any one port 104 can be connected to another port 104 using the bus 106 by transmitting data around the ring structure of the bus from one port 104 to another port 104. Furthermore, the bus 106 transmits data in a parallel format since it is connected to the parallel side of the serial to parallel converters 202. The parallel format of the bus 106 enables parallel data to be tapped out from the bus 106 at the parallel ports 102*a* and 102*b*. The ring structure of the bus 106 will be further described herein.

Figure 3:
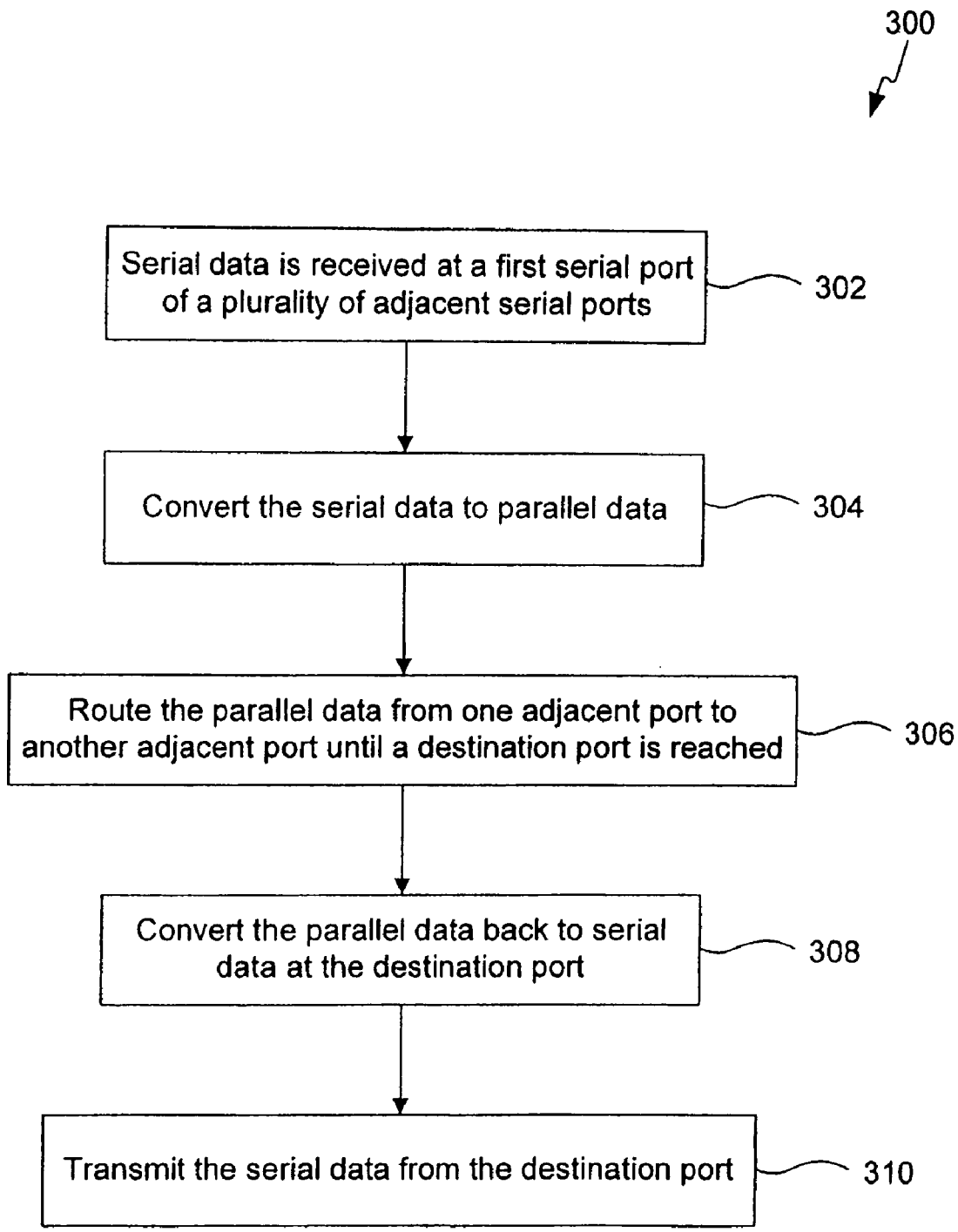

FIG. 3 illustrates a flowchart 300 that further describes the operation of the transceiver 100 in the routing of serial data between ports. In step 302, serial data is received at a first serial port 104, from a switch 108 for example. In step 304, the serial data is converted to parallel data. In step 306, the parallel data is routed from one adjacent port 104 to another via the bus 106 until a destination port 104 is reached. In step 308, the parallel data is converted back to serial. In step 310, the serial data is transmitted from the serial destination port 104, to a destination switch 108 for example.

The ports of the transceiver 100 can be configured to operate over a number of different data standards, as will be described further herein. For example, the serial ports 104 can transmit data to the switches 108 according to an XAUI serial protocol. The XAUI serial data is converted to XGMII parallel data for transmission over the parallel bus 106, and therefore the XGMII parallel data can be tapped-out by the parallel ports 102*a* and 102*b*.

FIG. 3 illustrates a flowchart 300 that further describes the operation of the transceiver 100 in the routing of data between serial ports. In step 302, serial data is received at a first serial port 104, from a switch 108 for example. In step 304, the serial data is converted to parallel data. In step 306, the parallel data is routed from one adjacent port 104 to another port 104 via the bus 106 until a destination port 104 is reached. In step 308, the parallel data is converted back to serial data. In step 310, the serial data is transmitted from the serial destination port 104, to a destination switch 108 for example. In an optional step (not shown), the parallel data can be tapped, prior to being serialized, and transmitted for further processing at another destination.

Furthermore, the inverse operation can also be performed. Parallel data is received at a parallel port 102 and routed to the other parallel port 102 or routed to a serial destination port 104. If routed to a serial destination port, then the data is serialized prior to transmission.

Figure 4:
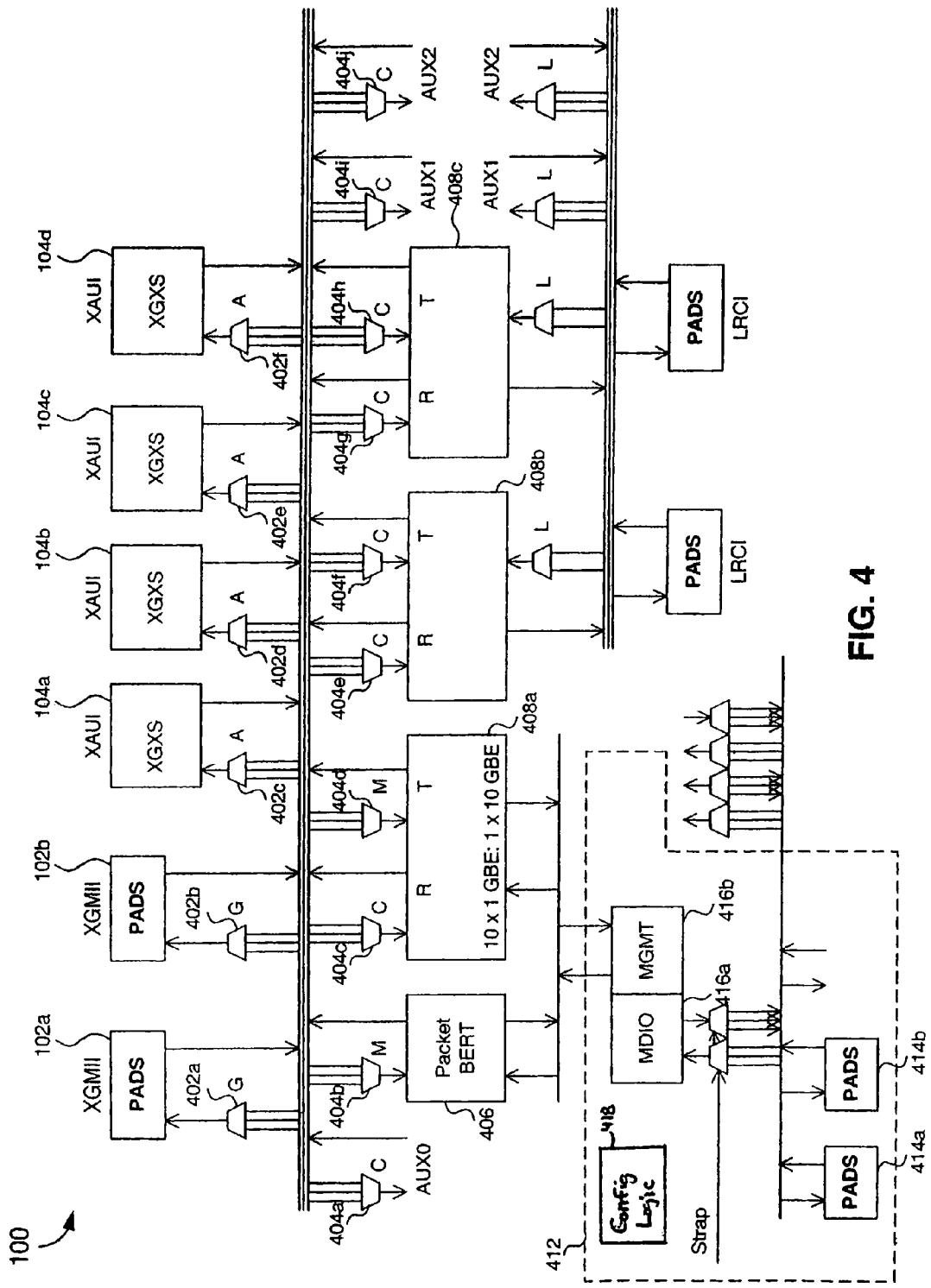
FIG. 4 illustrates a multi-port SERDES transceiver 400, which is one embodiment of the transceiver 100.

FIG. 4 illustrates a multi-port SERDES transceiver 400, which is one embodiment of the transceiver 100. The SERDES transceiver 400 includes multiple parallel ports 102 and serial ports 104, and includes the flexibility to connect any one of the parallel ports 102 to another parallel port 102 or to a serial port 104, or both. Furthermore, the multiport transceiver chip 400 can connect any one of the serial ports 104 to another serial port 104 or to one of the parallel ports 102.

More specifically, the SERDES transceiver chip 400 includes two parallel transceiver ports 102*a,b*, and four serial transceiver ports 104*a-d*. However, the invention is not limited to the number of ports shown. Other configurations having a different number of ports could be used. The parallel transceiver ports 102*a,b* transmit and receive data in a parallel format. The parallel transceiver ports 102*a,b* can be XGMII parallel ports, for example, where the XGMII transceiver protocol is known to those skilled in the arts. Each XGMII port 102 can include 74 data pins, for example, operating at $\frac{1}{10}$ the data rate of the serial ports 104. For example, the 74 pins can transmit 36 data signals and receive 36 data signals, simultaneously, and 2 clock signals (1 transmit and 1 receive).

The four serial ports 104*a-d* can be XAUI serial ports, and transmit and receive data in a serial format. Each serial port 104 can be a quad serial port having four serial differential data lines using the XAUI protocol that is known to those skilled in the arts. In embodiments of the invention, the serial ports 104 can operate at data rates of 3.125 GHz, 2.5 GHz, and 1.25 GHz. In other words, the transceiver chip 100 is a multi-rate device. However, the XAUI data rates above are effectively quadrupled since there are four serial data lines in each serial port 104. Therefore, the 2.5 GHz data rate is equalvalent to a 10 GHz data rate. As discussed above, the parallel data rates can operate at 1/10 of the data rates of the serial data.

The serial ports 104 can be further described as 10 Gigabit extension sub-letter (XGXS). In other words, XGXS defines the parallel-to-serial conversion between the parallel XGMII protocol to serial XAUI protocol, according to the IEEE Std 802.3ae, the entire standard of which is incorporated herein by reference. The serial ports 104 receive serial XAUI data and convert it to parallel XGMII data according the XGXS protocol. The parallel XGMII data is routed from adjacent port to adjacent port on the parallel bus 106.

As discussed above, the parallel ports 102 and the serial ports 104 are linked together by the parallel bus 106. The parallel bus 106 enables data to travel between all the ports 102 and 104. More specifically the bus 106 enables data to travel from one parallel port 102 to another parallel port 102, and to travel from one parallel port 102 to a serial port 104. Multiplexers 402 connect the bus 106 to the parallel ports 102 and to the serial ports 104. The serial port 104 performs a parallel to serial conversion when receiving parallel data that is to be sent out serial. Likewise the bus 106 enables data to travel from one serial port 104 to another serial port 104, and to travel between a serial port 104 and a parallel port 102. The parallel port 102 enables parallel data to be tapped from the parallel bus 106 so that parallel data (e.g. XGMII data) can be transmitted from the transceiver 400. The multi-port SERDES transceiver 400 is highly flexible in being able to connect multiple parallel ports 102 to multiple serial ports 104, and vice versa.

In embodiments, the SERDES transceiver chip 400 can be implemented on a single CMOS substrate. For example, the SERDES transceiver chip 400 can be implemented using a low power 0.13-micron CMOS process technology, which lends itself to higher levels of integration and application.

The transceiver 400 enables dual unit operation, where one parallel port 102 is paired up with two of the serial ports 104 and the other parallel port 102 is paired up with the other two serial ports 104. For example, parallel port 102a can be paired with serial ports 104a and 104b. Likewise, the parallel port 102b can be paired with serial ports 104c and 104d. However, there is complete selectivity of the ports that are grouped together for dual unit operation. For example, parallel port 102a can be paired with either serial ports 104a and 104b, or serial ports 104c and 104d. In a backplane configuration, this provides flexibility to connect a parallel port to one or more serial ports, and with redundancy.

The transceiver 400 also includes a packet bit error rate tester (BERT) 406. The packet BERT 406 generates and processes packet test data that can be transmitted over any of the serial ports 104 to perform bit error testing. Any type of packet data can be generated to perform the testing and at different data rates. For example, the packet BERT 406 can generate packet data that can be used to test the SERDES data link. As such, the packet BERT 406 provides a built-in self test for the SERDES data link. The packet BERT 406 generates test data that is sent over one or more of the serial ports 104 using the bus 106 to perform the bit error rate testing of the SERDES data link. For example, the packet BERT 406 can generate test data for a data link formed by enabling the serial ports 104a and 104b to connect the switch 108a to the switch 108c. Likewise, the packet BERT 406 can capture test data received over any one of the serial ports 104 or parallel ports 102 using the bus 106 for comparison with test data that was sent out. A bit error rate can then be determined based on this comparison.

In one embodiment, the packet BERT 406 is RAM-based so that the test data is stored and compared in a RAM memory to perform the bit error rate test. In another embodiment, the packet BERT 406 is logic based so that the test data is generated by a logic function, and transmitted across a SERDES link. Upon receipt back, the test data is re-generated by the logic packet BERT 406, for comparison with the original test data that was sent over the SERDES data link. A RAM packet BERT 406 is more flexible than a logic packet BERT 406 because there is no limitation on the data that can be stored in the RAM packet BERT 406. However, a logic packet BERT 406 is more efficient in terms of substrate area because a RAM occupies more area than a logic circuit.

Since the packet BERT 406 shares the same bus 106 with the serial ports 104, the packet BERT 406 can monitor (or "snoop") between the serial ports 104. In other words, if data is being transmitted from one serial port 104 to another serial port 104, the packet BERT 406 can capture and store a portion of this data for bit error testing. In one embodiment, the packet BERT 406 "blindly" captures data being sent from one serial port 104 to another serial port 104. In another embodiment, the packet BERT 406 starts capturing data after a particular byte of data is transmitted. In another embodiment, the packet BERT 406 starts capturing data after an error event occurs. The packet BERT 406 is further described in U.S. patent application Ser. No. 10/681,244, filed on Oct. 9, 2003, which is incorporated by reference herein in its entirety.

The SERDES transceiver chip 400 also includes the ability to include other optional logic blocks 408 that are not necessary for the operation of the SERDES transceiver. In other words, the logic blocks 408 could be customer driven logic blocks or some other type of logic block. These optional logic blocks 408 can transmit and receive data over the serial ports 104 or parallel ports 102 using the bus 106. The packet BERT 406 and the optional blocks 408 connect to the bus 106 using the multiplexers 404.

Figure 5:
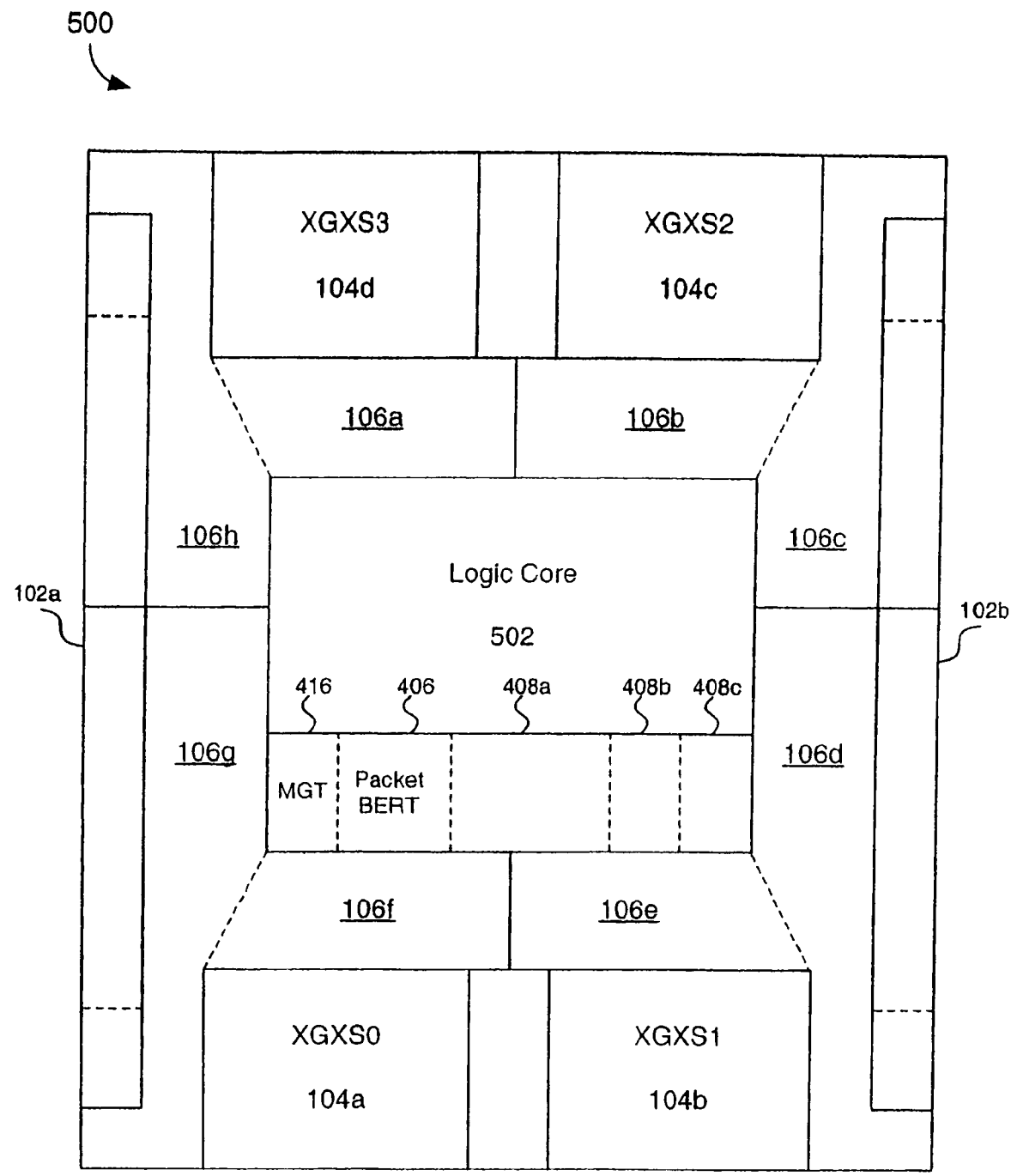
FIG. 5 illustrates a substrate layout of the multi-port SERDES transceiver chip according to embodiments of the present invention.

The SERDES transceiver chip 400 also includes a management interface 412 that enables the configuration of the portions (parallel ports 102, series port 104, packet BERT 406, and optional logic blocks 408) of the transceiver chip 100. The management interface 412 includes two pads 414 that enable two different management chips to program and control the portions of the transceiver chip 400 using MDIOs blocks 416. For example, one management chip connected to pad 414a could control the parallel port 102a and the serial ports 104a and 104b, and another management chip connected to pad 414b could control the parallel port 102b and the serial ports 104c and 104d. The management interface 412 is configured to be compatible with both IEEE Std. 802.3 clause 45 and the IEEE Std. 802.3 clause 22 management standards. In other words, one management pad 414a and MDIO block 416a can be programmed to be responsive to clause 45 electricals and protocol, and the other management pad 414b and MDIO block 416b could be responsive to clause 22 electricals and protocol. Furthermore, the management pads 414 and MDIO blocks can mix and match clause 22 and clause 45 electrical and protocols. For example, management pad 414a and MDIO block 416a can be responsive to clause 22 electricals and clause 45 protocols, and vice versa. Similar mix and match can be done for the management pad 414b and the MDIO block 416b. The management data pads are further described in U.S. patent application Ser. No. 10/694,729, titled "Multipurpose and Integrated Pad Ring for Integrated Circuit", filed Oct. 29, 2003, and U.S. patent application Ser. No. 10/694,730, titled "Programmable Management I/O Pads for an Integrated Circuit", filed Oct. 29, 2003, both of which are incorporated by reference herein in its entirety. FIG. 5 illustrates the substrate layout 500 for the SERDES transceiver 400 according to embodiments of the invention. The substrate layout 500 is configured to minimize the substrate area of the transceiver 400, and efficiently provide the port interconnections described above.

The substrate layout 500 is configured so that the parallel ports 102a,b and the serial ports 104a-d are on the outer perimeter of the substrate 200, as shown. In other words, the serial ports 104a and 104b are on a first side of the substrate layout 500 and the serial ports 104c and 104d are on a second side of the substrate layout 500. The parallel port 102a is on a third side of the substrate layout 500. And the parallel port 102b is on a fourth side of the substrate layout 500. A logic core 502 is at the center of the substrate 500, where the logic core 502 operates the bus 106 and the serial 104 and parallel 102 data ports. The management interface 412, the packet BERT 406, and the optional logic blocks 408a-c are adjacent to the logic core 502 as shown. The bus 106 can be described as a "ring" structure (or donut "structure") around the logic core 502, and is placed in between the logic core 502 and the data ports 102 and 104 that occupy the parameter of the substrate layout 500. Furthermore, the ring structure of the bus 106 also provides efficient communication between the logic core 502 and the various data ports 102 and 104. Furthermore, the ring structure of the bus 106 also provides efficient communication between the management interface 412, the packet BERT 406, the optional logic blocks 408, and the various data ports 102 and 104.

The bus 106 is illustrated as 8 sections 106a-106g for ease of illustration. Each section provides an interface to the respective data ports 102 or 104 that are adjacent to the respective sections.

Figure 6:
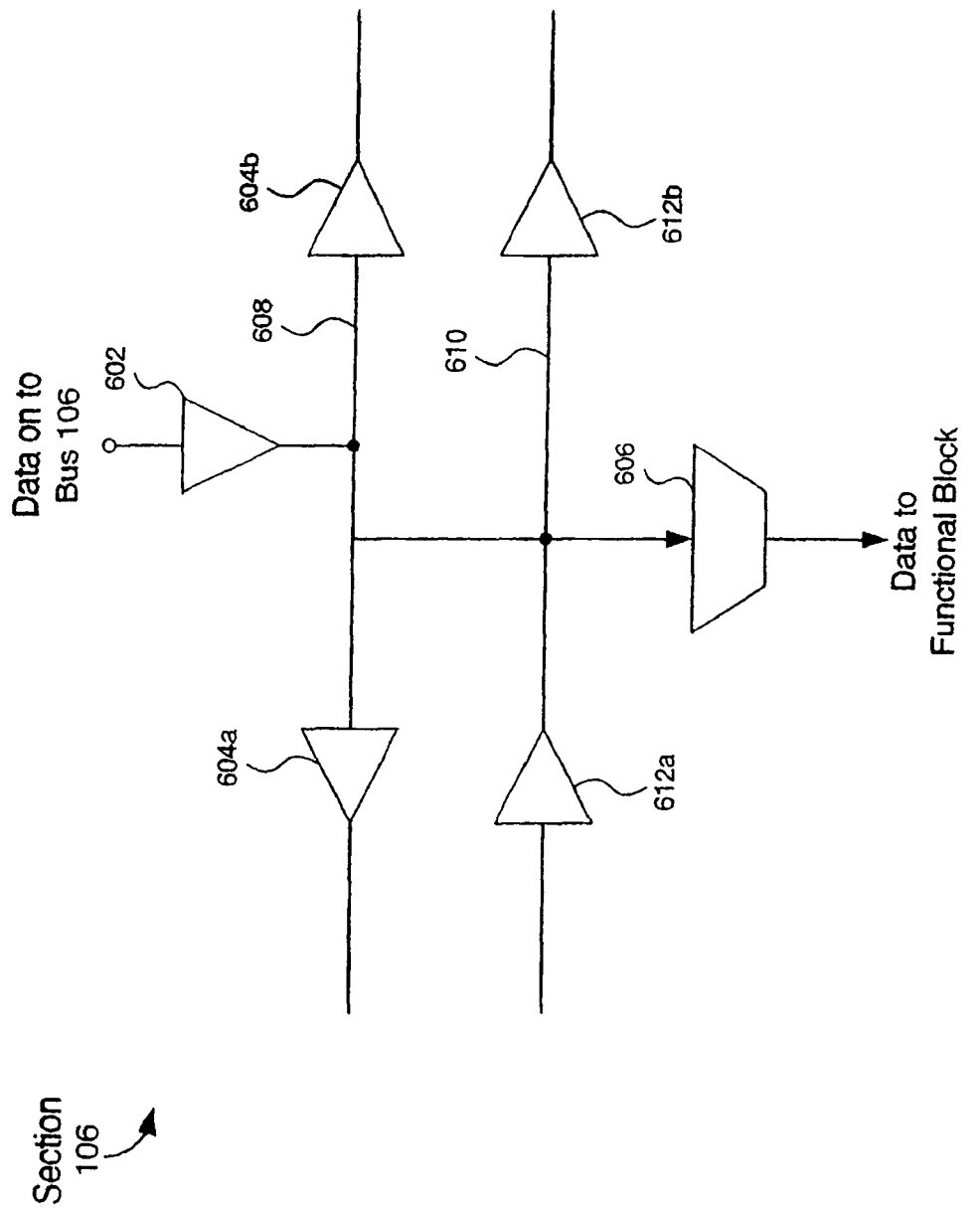
FIG. 6 illustrates a section of the bus 106 according to embodiments of the present invention.

FIG. 6 represents one of the 8 sections 106a-106g of the bus 106 according to embodiments of the present invention. Each section of the bus 106 can be represented as two paths 608 and 610. Data enters the bus 106 through a buffer 602 and proceeds to its destination along the path 608 and through the buffers 604. Data passes from one section to another section of the bus 106 using the path 610 and passing through the buffers 612. The mux 606 represents data passing from the bus 106 to a functional block, such as a data port 102, 104 or the packet BERT 406. The actual wires and buffers on the bus 106 are matched to minimize signal distortion.

In embodiments, the data wires in the bus 106 are deposited on the substrate 500 in a particular fashion. Namely, a power or ground is placed between adjacent (or near by) data wires. Furthermore, adjacent data wires on the bus 106 are placed on two separate layers. Therefore, a power or ground will be above or below a data wire, and adjacent to a data wire. Therefore, two nearby data wires will not be located directly adjacent one another, but instead will be positioned diagonal to each other, thereby reducing cross talk.

The parallel bus 106 is further described in U.S. patent application Ser. No. 10/695,485, titled "Cross Link Multiplexer Bus", filed Oct. 29, 2003, and incorporated by reference herein in its entirety. The multi-port SERDES transceiver 400 supports multiple different data protocols at the pads including XGMII, TBI, RTBI, HSTL, SSTL, or LVTTL protocols, and others.

FIG. 7 further illustrates an example layout of the bus 106. The wires 702 between data ports 102, 104 are configured to have the same path lengths so as to minimize signal distortion. In other words, wires 702a-d are deposited so as to have the same path length so as to reduce signal distortion.

The multi-port SERDES transceiver 400 includes the ability to change the timing of the data ports 102 and 104. This includes the ability to change the timing between the data and clock signals. In other words, the registers in the data ports 102 and 104 can be re-programmed to operate at different timing protocols.

The SERDES transceiver 400 is highly flexible and can be configured to provide multiple different transceivers by enabling and disabling various serial and parallel data ports. This is accomplished using a configuration logic circuit 418 that controls the registers and timing of the data ports 102 and 104, and also enables/disables these data ports. As a result, several different transceiver products can be configured from a single semiconductor die that is manufactured with the 4 serial data ports and 2 parallel data ports. For instance, FIG. 1 illustrates an embodiment, where all four serial ports 104 and both parallel ports 102 are enabled and accessible to exchange data. The transceiver 400 represents the maximum capability that can be achieved from the 4 serial and two parallel data ports. Other specific examples are discussed below, but the invention is not limited to these examples.

FIG. 8 illustrates a transceiver 800 having 4 serial XGXS data ports 104. The two parallel ports 102 have been disabled using configuration logic 418 and/or by not bonding the parallel ports to the output pins of the semiconductor package. The transceiver 800 enables any of the switches 108 to exchange data with any of the other switches 108.

FIG. 9 illustrates a transceiver 900 having 2 serial XGXS data ports 104a and 104b and two XGMII parallel data ports 102a and 102b. The other two serial data ports 104c and 104d have been disabled using configuration logic 418 and/or by not bonding the ports to the output pins of the semiconductor package. The transceiver 900 enables the switch 108a to exchange data with the switch 108b, and allows the parallel XGMII data to be tapped from the parallel bus 106 using the parallel XGMII data ports 102a 102b.

In another embodiment of FIG. 9, the timing of the serial and parallel ports is varied to provide another transceiver product. For instance, the two XGXS serial ports can be configured as 8 SERDES ports that operate at a slower data rate than the XGXS data ports. Likewise, the two XGMII parallel data ports can be configured as 8 TBI data ports that also operate at a slower data rate. In general, the timing of the data ports can be revised and reconfigured for each of the transceiver configurations shown herein.

FIG. 10 illustrates a transceiver 1000 having 2 serial XGXS data ports 104a and 104b and only one XGMII parallel data port 102a. The other two serial data ports 104c and 104d and the parallel port 102b have been disabled using configuration logic 418 and/or by not bonding the ports to the output pins of the semiconductor package. The transceiver 1000 enables the switch 108a to exchange data with the switch 108b, and allows the parallel XGMII data to be tapped from the parallel bus 106 using the parallel XGMII data port 102a.

FIG. 11 illustrates a transceiver 1100 having 2 serial XGXS data ports 104a and 104c and no XGMII parallel data port 102a. The other two serial data ports 104c and 104d and the parallel ports 102 have been disabled using configuration logic 418 and/or by not bonding the disabled ports to the output pins of the semiconductor package. The transceiver 1100 enables the switch 108a to exchange data with the switch 108c.

FIG. 12 illustrates a transceiver 1200 having 3 serial XGXS data ports 104a, 104b, and 104d and one XGMII parallel data port 102a. The other serial data ports 104c and the parallel port 102a have been disabled using configuration logic 418 and/or by not bonding the disabled ports to the output pins of the semiconductor package. The transceiver 1200 enables the switches 108a, 108b, and 108d to exchange data with each other.

Based on the above discussion, it is apparent that the base transceiver 400 is highly flexible and enables multiple transceiver products, with different capabilities and price points, to be configured and sold from the base semiconductor die.

Automatic Polarity Swap

FIG. 13 illustrates a communications system 1300 having a first SERDES transceiver 100a that communicates data with a second SERDES transceiver 100b through an interface 1303, that may be a backplane for example. The SERDES transceivers 100a and 100b can be any type of the transceivers discussed herein, or any other type of transceiver. The SERDES transceiver 100a can be represented as having a differential input 1301p and 1301n and a differential output 1302p and 1302n. Likewise, the SERDES transceiver 100b can be described as having a differential input 1304p and 1304n, and a differential output 1306p and 1306n.

During the configuration of the backplane 1303, the differential output 1302 of the transceiver 100a can be mistakenly cross-connected with the differential input 1304 of the SERDES transceiver 100b. In other words, the 1302n output of the transceiver 100a can be mistakenly connected to the 1304p input of the transceiver 100b. Likewise, the 1302p output of the transceiver 100a can be mistaken connected to the 1304n input of the transceiver 100a. The result of such a cross-connection is that invalid data words are received at the SERDES transceiver 100b, which causes an increase in the bit error rate (BER).

FIG. 14 illustrates an apparatus and method of automatic polarity swap to address the cross-connection problem discussed with reference to FIG. 13. FIG. 14 illustrates a transceiver 1400 having an error check and correction module 1401. The error check and correction module 1401 includes an error check 1402 and a exclusive OR (X-OR) 1404. The error check and correction module 1401 is coupled to the output of the serial-to-parallel converter 202 and checks the digital output of the serial-to-parallel converter 202 to determine if it is a valid digital word. If it is not a valid digital word, then the module 1401 performs an automatic polarity flip of the digital word.

The error check and correction module 1401 includes an error check 1402 at the output of the parallel-to-serial converter 202a. The error check module 1402 examines the digital word at the output of the parallel-to-serial converter 1402 and determines if it is a valid digital word within the context of the communications system 1300. For example, the error check module 1402 can include a RAM memory that stores the possible digital word combinations for comparison with the digital word output of the serial-to-parallel converter 202. If the digital word output of the serial-to-parallel converter 202a does not match any one of the possible combinations, then the digital word output of the serial-to-parallel converter is not a valid digital word. Accordingly, one possibility is that the interface 1303 is cross-connected as discussed above. If this is so, then flipping the polarity of the bits that make up the digital word, will convert the invalid digital word to a valid digital word. This can be accomplished using an exclusive-OR gate 1404. When the error check module 1402 detects an invalid digital word, then the error check module 1402 sends a control bit logic "1" to the exclusive-OR 1404, which causes the exclusive OR to invert the digital output from the serial-to-parallel converter, and generate a inverted digital word 1405. If the error was introduced by the cross-connection, then the inverted digital word 1405 will be a valid digital word.

The error check module 1402 outputs a control bit "0" when it determines that the digital word at the output of the serial-to-parallel converter is a valid digital word. A control bit "0" does not invert the digital word, so that the digital word passes unchanged for further processing.

The error check and correction module 1401 can be implemented using other configurations as will be understood by those skilled in the arts based on the discussion given herein. For instance, a logic circuit other than an X-OR can be used to flip the polarity of the digital word if it is invalid.

An advantage of implementing the automatic polarity swap is that cross-connect errors are rectified quickly and easily, without having to re-wire or re-configure any hardware. Furthermore, the polarity swap can be implemented on the transmit side or the receive side. However, the receive implementation is shown in FIG. 14. The transmit implementation will be apparent based the description related to FIG. 14.

FIG. 15 illustrates a flowchart 1500 that further describes an automatic polarity swap according to embodiments of the present invention.

In step 1502, a serial differential signal is received. In step 1504, the serial differential signal is converted to a parallel differential data word.

In step 1506, the parallel differential data word is examined to determined if it is a valid data word for the corresponding communications system. For instance, the parallel differential data word can be compared with valid data words that are stored in a RAM. If the parallel differential data word is valid, then it is passed unmodified for further processing. For example, a valid data word can be re-serialized and transmitted to a destination switch or MAC.

In step 1508, the parallel differential data word is inverted if the parallel differential data word is found to be invalid in step 1506. For instance, a logic circuit (such as the X-OR 1404) can be used to invert the parallel data word is if it is invalid.

In step 1510, the inverted parallel data word can be re-examined to determine if it is now a valid data word, and if so the inverted parallel data word can be further processed. For example, the inverted parallel data word can be serialized and retransmitted to a destination switch, or MAC.

CONCLUSION

Example embodiments of the methods, systems, and components of the present invention have been described herein. As noted elsewhere, these example embodiments have been described for illustrative-purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

What is claimed is:
1. A method for transmitting data, comprising:
(A) receiving a first stream of serial data by a first serial port;
(B) converting the first stream serial data to a stream of parallel data;

(C) routing the stream of parallel data from the first serial port through one or more adjacent ports until reaching a second serial port, the first and the second serial ports and the one or more adjacent ports being arranged in a ring structure that is configured to transmit the stream of parallel data in a parallel format;

(D) converting the stream of parallel data to a second stream of serial data at the second serial port; and (E) transmitting the second stream of serial data from the second serial port.

2. The method of claim 1, wherein step (A) comprises:

(A)(i) receiving a first 10 Gigabit Attachment Unit Interface (XAUI) stream of serial data by the first serial port.

3. The method of claim 2, wherein step (B) comprises:

(B)(i) converting the first XAUI stream of serial data to 10 Gigabit Media Independent Interface (XGMII) stream of parallel data.

4. The method of claim 3, wherein step (D) comprises:

(D)(i) converting the XGMII stream of parallel data to a second XAUI stream of serial data.

5. The method of claim 4, wherein step (E) comprises:

(E)(i) transmitting the second XAUI stream of serial data from the second serial port.

6. The method of claim 1, wherein step (B) comprises:

(B)(i) converting the first stream serial data to the stream of parallel data using a 10 Gigabit Ethernet Extended Sublayer (XGXS) conversion protocol.

7. The method of claim 1, wherein step (D) comprises:

(D)(i) converting the stream of parallel data to the second stream of serial data at the second serial port using a 10 Gigabit Ethernet Extended Sublayer (XGXS) conversion protocol.

8. A method for transmitting data, comprising:

(A) receiving a stream of serial data by a serial port;

(B) converting the stream of serial data to a stream of parallel data;

(C) routing the stream of parallel data from the serial port through one or more adjacent ports until reaching a parallel port, the serial port, the one or more adjacent ports, and the parallel port being arranged in a ring structure that is configured to transmit the stream of parallel data in a parallel format; and (D) transmitting the stream of parallel data from the parallel port.

9. The method of claim 8, wherein step (A) comprises:

(A)(i) receiving a 10 Gigabit Attachment Unit Interface (XAUI) stream of serial data by the serial port.

10. The method of claim 9, wherein step (B) comprises:

(B)(i) converting the XAUI stream of serial data to 10 Gigabit Media Independent Interface (XGMII) stream of parallel data.

11. The method of claim 10, wherein step (D) comprises:

(D)(i) transmitting the XGMII stream of parallel data from the parallel port.

12. The method of claim 8, wherein step (D) comprises:

(D)(i) converting the stream of serial data to the stream of parallel data using a 10 Gigabit Ethernet Extended Sublayer (XGXS) conversion protocol.

13. A method for transmitting data, comprising:

(A) receiving a stream of parallel data by a parallel port;

(B) routing the stream of parallel data from the parallel port through one or more adjacent ports until reaching a serial port, the parallel port, the one or more adjacent ports, and the parallel port being arranged in a ring structure that is configured to transmit the stream of parallel data in a parallel format;

(C) converting the stream of parallel data to a stream of serial data; and (D) transmitting the stream of serial data from the serial port.

14. The method of claim 13, wherein step (A) comprises:

(A)(i) receiving a stream of 10 Gigabit Media Independent Interface (XGMII) stream of parallel data by the parallel port.

15. The method of claim 14, wherein step (C) comprises:

(C)(i) converting the XGMII stream of parallel data to a 10 Gigabit Attachment Unit Interface (XAUI) stream of serial data.

16. The method of claim 15, wherein step (D) comprises:

(D)(i) transmitting the XAUI stream of serial data from the serial port.

17. The method of claim 13, wherein step (D) comprises:

(C)(i) converting the stream of parallel data to the stream of serial data using a 10 Gigabit Ethernet Extended Sublayer (XGXS) conversion protocol.

18. The method of claim 1, further comprising:

(F) capturing the stream of parallel data for bit error testing as the stream of parallel data is routed from the first serial port.

19. The method of claim 8, further comprising:

(E) capturing the stream of parallel data for bit error testing as the stream of parallel data is routed from the serial port.

20. The method of claim 13, further comprising:

(E) capturing the stream of parallel data for bit error testing as the stream of parallel data is routed from the parallel port.

* * * * *